United States Patent

Muramatsu et al.

[11] Patent Number: 5,151,658
[45] Date of Patent: Sep. 29, 1992

[54] THREE-DIMENSIONAL DETECTION SYSTEM FOR DETECTING FRACTURES AND THEIR DISTRIBUTIONS IN THE EARTH CRUST UTILIZING AN ARTIFICIAL MAGNETIC FIELD AND MAGNETIC PARTICLE TRACER

[75] Inventors: Shigeki Muramatsu; Shinji Takasugi; Kazumi Osato, all of Tokyo, Japan

[73] Assignee: Chinetsu Gijutsu Kaihatsu Kabushiki Kaisha, Tokyo, Japan

[21] Appl. No.: 723,178

[22] Filed: Jun. 28, 1991

[51] Int. Cl.$^5$ ............ G01V 3/26; G01V 3/40; E21B 47/10
[52] U.S. Cl. .................. 324/346; 73/155; 166/254; 324/325; 324/339
[58] Field of Search ........ 324/325, 338, 339, 340, 324/343, 345, 346; 166/66.5, 250, 253–255; 73/151, 155

[56] References Cited

U.S. PATENT DOCUMENTS

| | | | |
|---|---|---|---|
| 3,187,252 | 6/1965 | Hungerford | 324/343 |
| 4,222,444 | 9/1980 | Hamilton | 166/66.5 X |
| 4,253,063 | 2/1981 | Tweeton | 324/372 X |
| 4,264,862 | 4/1981 | Koelle et al. | 324/343 X |
| 4,491,796 | 1/1985 | Smith | 324/346 |
| 4,875,015 | 10/1989 | Ward | 324/346 X |

Primary Examiner—Gerard R. Strecker
Attorney, Agent, or Firm—Oblon, Spivak, McClelland, Maier & Neustadt

[57] ABSTRACT

A three-dimensional detection system for detecting fractures and their distributions in the earth crust utilizing an artificial magnetic field which comprises: a magnetic particle tracer being injected into the fractures of the earth crust, having high magnetic permeability and specific weight of the same degree with a fluid substance existing in the fractures; and inner borehole magnetic field detecting devices being hung in boreholes which are dug in the earth crust and having transmitters and/or receivers operating at a predetermined frequency.

9 Claims, 9 Drawing Sheets

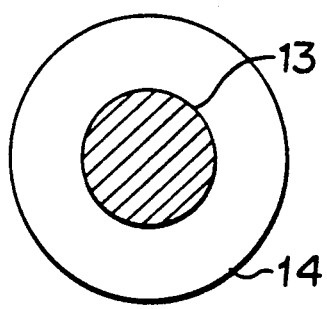
FIGURE 2A
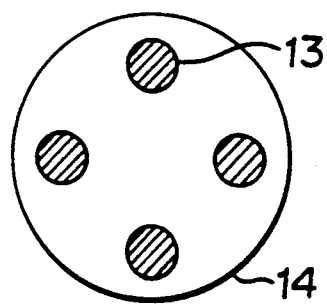
FIGURE 2B
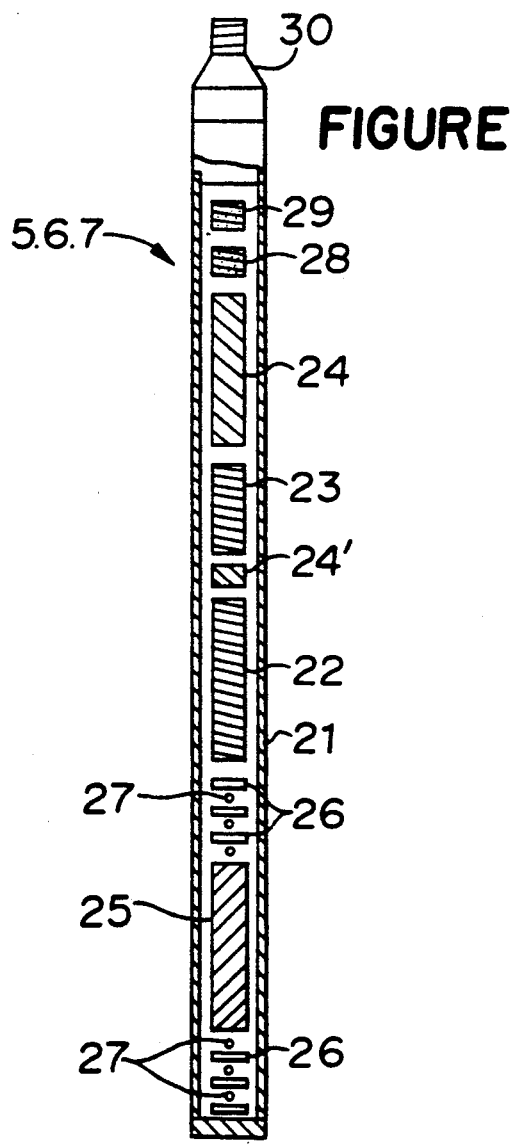
FIGURE 3A
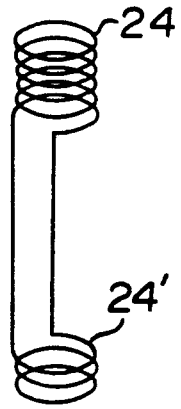
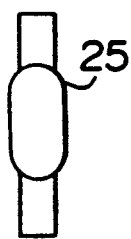
FIGURE 3B

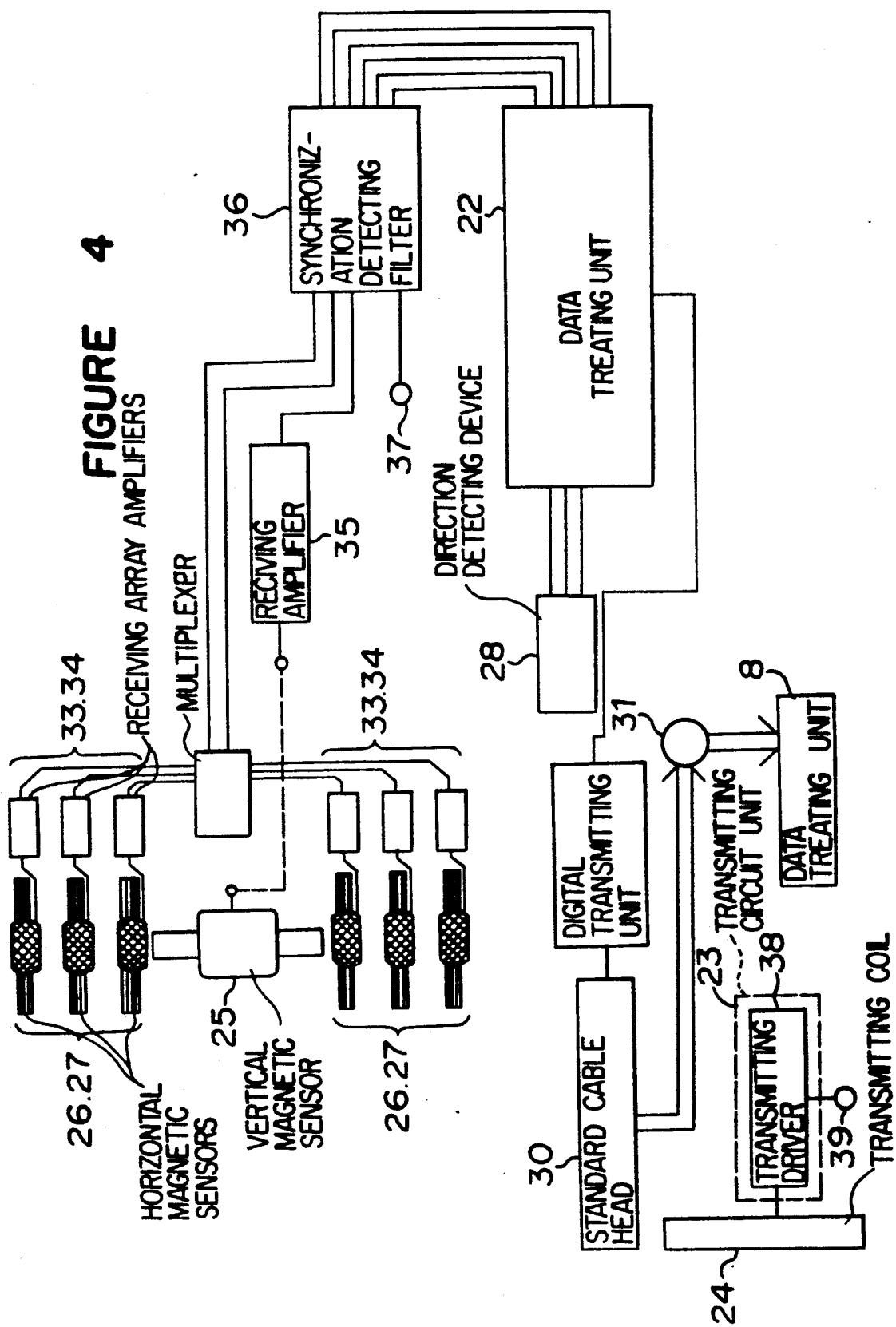

VERTICAL SHEET

HORIZONTAL SHEET

SHEET SIZE: 50 m X 20 m
THICKNESS: 2 mm
MAGNETIC SUSCEPTIBILITY (k): 0.3
   $k = (\mu/\mu 0 - 1)/4\pi$ $p$ = 10 OR 100 $\Omega$-m
FREQ. = 0.1, 0.3, 1.0, 3.0, 10.0, AND 30.0 kHz
S = 1, 2, 4, 8, 16 AND 32 m

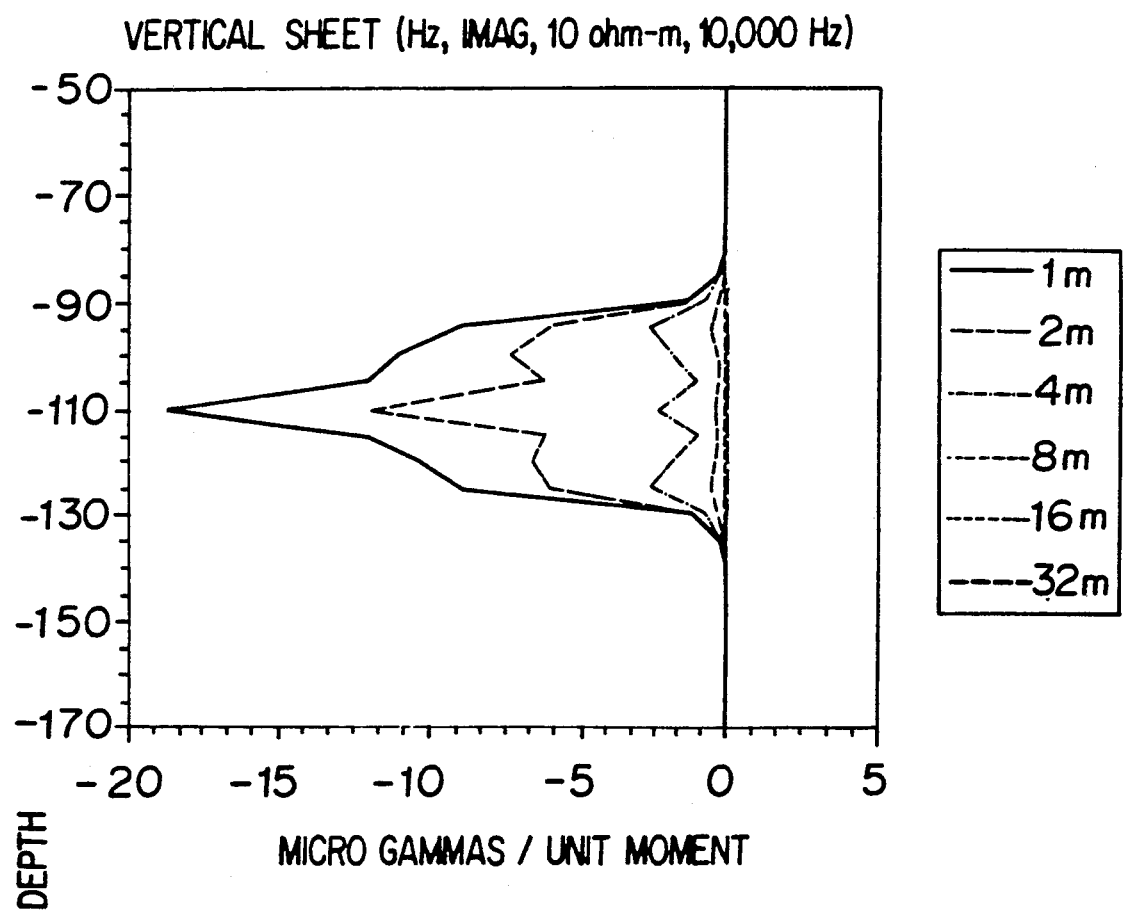

THREE-DIMENSIONAL DETECTION SYSTEM FOR DETECTING FRACTURES AND THEIR DISTRIBUTIONS IN THE EARTH CRUST UTILIZING AN ARTIFICIAL MAGNETIC FIELD AND MAGNETIC PARTICLE TRACER

BACKGROUND OF THE INVENTION

1. Field of the Invention

This invention relates to a system which enables a three-dimensional analysis, through physical measurements, that detects the shape of a fracture, an underground water fluidizing state containing geothermal water (hereinafter, simply underground water fluidizing), and its distribution state adjacent to boreholes dug in the ground.

2. Discussion of the Background

Formally, for this kind of geophysical technology in general, there exists; a method which measures specific resistance of the ground by utilizing electromagnetic phenomena, a method which measures a transmission wave or a reflection wave by emitting an ultrasonic wave or an elastic wave, and a method which investigates the underground rock density by measuring natural $\gamma$ rays in the ground, or by measuring scattering of $\gamma$ rays from an artificial radiation source. A method which is called geotomography, is performed to search underground dislocation states by data gathering and treating of these measurement results. Furthermore, in recent times, in addition to this, a three-dimensional approach is being tried by effectively using available boreholes.

However, these conventional underground search methods have difficulties in accurately detecting the shape of a fracture in the earth crust, the underground water fluidization state, and its distribution, to accurately grasp the existence or the shape of an underground water fluidization layer in rock fissures, a hydrocarbon or oil layer, probably due to the roughness of the sampled data. The existence of the geothermal water layer can be estimated by the existence of a gushing steam. A chemical substance such as potassium iodide, used as a fluidization index, is injected into a gushing borehole, under a precise control on the predetermined time interval and the concentration. By sampling the chemical substance from a borehole drilled at another place or from another gushing borehole, and by measuring its concentration and sampling time, the shape of a fracture in the earth crust, geothermal water fluidization state, and its distribution state, are estimated. However, the numerical value of the chemical substance would be known only after the sampling, and the change in the concentration can be considerably subtle.

Furthermore, in this search involving the injection of a chemical substance, only the end points of the underground water fluidization can be estimated, and the passage of fluidization can not accurately be grasped.

SUMMARY OF THE INVENTION

It is an object of the present invention to provide a three-dimensional detection system for detecting fractures and their distributions in the earth crust utilizing an artificial magnetic field which comprises:

a magnetic particle tracer being injected into the fractures of the earth crust, having high magnetic permeability and specific weight nearly equal to that of a fluid substance existing in the fractures; and inner borehole magnetic field detecting devices being hung in boreholes which are dug in the earth crust and having transmitters and/or receivers operating at a predetermined frequency.

The magnetic particle tracer may be coated so that the particle may be dispersed in water. The inner borehole magnetic devices may have three-component magnetic sensors.

One of the inner borehole magnetic devices may emit the electromagnetic field and the other thereof may receive the signal caused by the induction effect.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are diagrams showing an embodiment in which a single body or several particles of a high permeability substance are coated with a surface material;

FIG. 3A is a sectional outline diagram showing inner borehole instruments (probe) 5, 6, and 7;

FIG. 3B is a diagram showing an embodiment in which the compensation coil 24' is installed between the transmitting coil 24 and the vertical coil 25;

FIG. 4 is a circuit block construction diagram showing an electric construction outline composed of inner borehole instruments 5, 6 and 7, a connecting long size cable 31, and the inter-borehole data treatment device 8;

FIG. 9B is a diagram showing the imaginary part of the magnetic field caused by the fracture model.

DETAILED DESCRIPTION OF THE PREFERRED EMBODIMENTS

Figure 1:
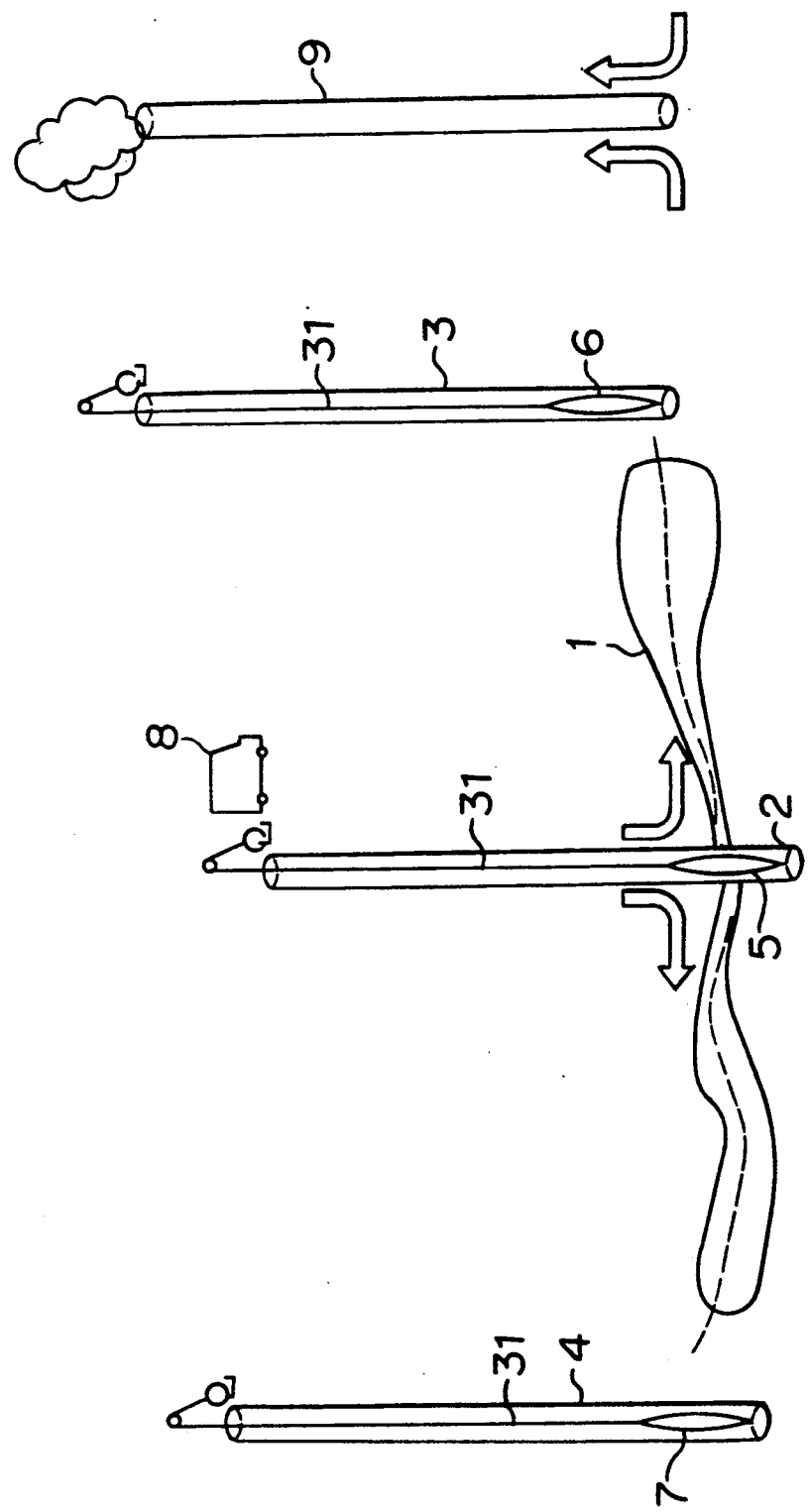
FIG. 1 is an outline diagram showing an underground water fluidization detection system to which the present invention is applied.

FIG. 1 is an outline diagram showing an embodiment of the underground water fluidization detection system according to the present invention.

In FIG. 1, a numeral 1 signifies a fracture in the earth crust in which geothermal water exists; 2, a borehole (#1) drilled in the fracture 1; 3 and 4, the other boreholes (#2) and (#3) drilled in the neighborhood of the borehole (#1); 5, 6, and 7, inner borehole measuring instruments hung in the boreholes (#1), (#2) and (#3), respectively. These instruments contain three-dimensional magnetic force meters which measure variations of the terrestrial magnetic field due to the movement and distribution of the above magnetic particle tracer. A numeral 8 designates an inner borehole data treatment device which receives directly or remotely the measured data from these inner borehole measuring instruments 5, 6, and 7, and performs the data analysis. A numeral 9 signifies a gushing borehole which strikes geothermal water by drilling.

Under the system outlined above, first of all, a particle magnetic tracer having high magnetic permeability is injected from the borehole 2 (#1) drilled down to the above fracture 1.

As for the magnetic particle as a tracer, it is preferable that the magnetic particle has high magnetic permeability (initial magnetic permeability of about 100), a particle size easy to fluidize, for instance, 1 to several tens of microns, and an elevated temperature stability having high Curie point since it is used in geothermal water. Furthermore, it is even more preferable that the magnetic particle is inexpensive as a high permeability material. Furthermore, it is necessary for the magnetic particle to have a high fluidity in a geothermal water layer. It is preferable for the magnetic particle to have an excellent dispersion property with respect to water and a low specific weight. Accordingly, in this embodiment, magnetic particles are used in which the above high permeability material is coated with a surface material that has an excellent dispersion property with respect to water. Accordingly, it is desirable for the coating material to have low specific weight so that the particles are easy to fluidize in the geothermal water layer, to have thermal resistance, and to be made at low cost.

In this embodiment, Mn-Zn-ferrite, PB-permalloy, PC-permalloy, SENDUST (made by Tokin (K. K.): commercial name), etc. are used as the above high permeability material. An excellent result is obtained with a composition (%) of 5Al-10Si-Fe, resulting in initial permeability $\mu_m = 30,000$, the maximum permeability $\mu_0 = 120,000$, the coercive force Hc=0.05 (oersted), Wh=100 (erg·cm$^{-3}$·cycle$^{-1}$), the specific resistance, 80 ($\mu\Omega$·cm), the density, 6.8 (g·cm$^{-3}$), the particle size, $-400$ mesh. The resulting coated particle has a flat shape, annealed, and has the high initial permeability of 40. However, in these high permeability substances, the specific weight is large. For instance, in case of the above SENDUST, the specific weight is equal to or more than 6. Therefore the material sinks in water, and even if it is injected, the material is devoid of fluidizing and diffusing property.

Accordingly, as mentioned above, this high permeability material composed of a single body or several particles, as shown in FIGS. 2A and 2B, is coated so that the material has an excellent dispersion property with respect to water. In FIGS. 2A and 2B, a numeral 13 signifies a magnetic tracer having high permeability, and 14, a surface material which coats the magnetic tracer.

The particle size of the coated surface material is determined by the specific weight and the shape of the surface material which is utilized for maintaining the dispersion property and high fluidity with respect to water. The specific weight of the total body is a sum value of that of the above high permeability material and that of the surface material. Therefore the particle size of the total body is desirable to be about 40 $\mu$m.

The above treated high permeability material, when it is injected into the borehole 2 (#1) drilled down to the above fracture 1, is diffused and moved into the geothermal water which flows in the fracture 1, subjected to the speed of the geothermal water movement.

Next, a variation of the terrestrial magnetic fields is measured by putting down the above inner borehole instruments (probe) 5, 6, and 7, down in the borehole 2 (#1), or in the other boreholes 3 (#2) and 4 (#3) which are drilled in the neighborhood of the borehole 2 (#1), respectively.

FIG. 3A shows the outline of the inner borehole instruments (probe) 5, 6, and 7.

FIG. 3A is an outline sectional construction diagram showing the inner borehole instruments (probe) 5, 6, and 7. The inner borehole instrument (probe) is provided with a transmitter unit which transmits an electromagnetic field of several to several ten thousands hertz, and a receiver unit which receives the resulting total magnetic field.

This inner borehole instrument (probe), as shown in FIG. 3A, is composed of the nonmagnetic cylindrical heat resistant vessel (dewar) 21 with a diameter of three inches (7.5 cm) and a length of 6 m, a vacuum tube structure which protects the inside from heat. As for the inner construction, the transmitting and receiving data treatment unit 22 and the transmitting circuit unit are located at the central part of the vessel. The distance between the transmitting coil 24 and the vertical magnetic sensor (Z direction) 25 in three component magnetic force meters, or the distance between the transmitter center and the receiver center, is about 4 m. On top of and at the bottom of the vertical magnetic sensor (Z direction) 25, a total of six of the X-direction horizontal magnetic sensors 26 and the Y-direction horizontal magnetic sensors 27 are located.

Along with the above transmitting coil 24, as shown in FIG. 3B, a compensation coil 24' possessing one eighth of the magnetic moment of the above transmitting coil 24 is located between the transmitting coil 24 and the vertical coil 25 to reduce magnetic interference in the above vertical coil 25.

Furthermore, the inner borehole instruments 5, 6, and 7 have the direction detecting device 28 composed of a gyrocompass to accurately detect the position of the instruments.

Initial data treatment is performed in the transmitting and receiving data treatment unit 22. The treated data is converted to digital data by the digital transmitting unit 29, and sent to the ground surface through the standard cable head 30 and the long size cable 31 (not shown in FIG. 3).

A control signal containing transmitting frequency informations and specific output informations to be sent to the ground is sent from the ground surface to the transmitting and receiving data treatment unit 22 through the long size cable 31, as digital data. An electromagnetic field with a predetermined frequency and a predetermined output, is emitted into the ground from the transmitting circuit unit 23 through the transmitting coil 24. The long size cable 31 is connected to the inner borehole data treating unit 8 installed adjacent to the top of the borehole 2 (#1) on the ground surface as shown in FIG. 1. The inner borehole data treating unit 8 transmits the transmitting informations to the inner borehole instruments 5, 6, and 7 and obtains measurement data from the inner borehole instruments 5, 6, and 7, and performs the data analysis.

FIG. 4 is a circuit block construction diagram showing an electrical construction outline of the inner borehole instruments 5, 6, and 7, the connecting long size cable 31, and the inner borehole data treating unit 8 wherein the same reference numerals designate the same or corresponding parts in FIG. 1 and in FIG. 3. In FIG. 4, a numeral 33 designates a receiving array amplifier of the X-direction horizontal magnetic sensor 26 in the three axes magnetic force meters which measure a variation in the terrestrial magnetic field, 34, a receiving array amplifier of the Y direction horizontal magnetic sensor 27 in the three axes magnetic force meters, and 35, a receiving amplifier of the vertical magnetic sensor 25 (Z direction).

The received signals from the respective amplifiers 33, 34, and 35 are led to the synchronization detecting filter 36 composed of a synchronization detector (not shown) and a filter (not shown). The output of the synchronization detecting filter 36 is sent to the above transmitting and receiving data treating unit 22.

This transmitting and receiving data treating unit 22 is connected to the direction detecting device 28. The position and depth signal from the direction detecting device 28 is sent to the transmitting and receiving data treatment unit 22. In the transmitting and receiving data treatment unit 22, sampling is performed on the above detected data in a predetermined order which is produced by a microprocessor controlled multiplexer (not shown). The analog data is converted to digital data by a convertor (not shown). The digital data is sent to the digital transmitting unit 29, after frequency filtration and data shaping, and sent to the ground surface through the standard cable head 30 and the long size cable 31.

The above synchronization detecting filter 36 has the input terminal 37 which receives transmitting reference information branched from the transmitting driver 38 of the transmitting circuit unit 23 that drives the transmitting coil 24. Corresponding to that, the transmitting driver 38 of the transmitting circuit unit 23 has the output terminal 39.

Next, referring to FIGS. 5 and 6, an explanation will be given on the measurement method of a distortion of line of magnetic force caused by the magnetic anomaly of the earth crust.

Figure 5:
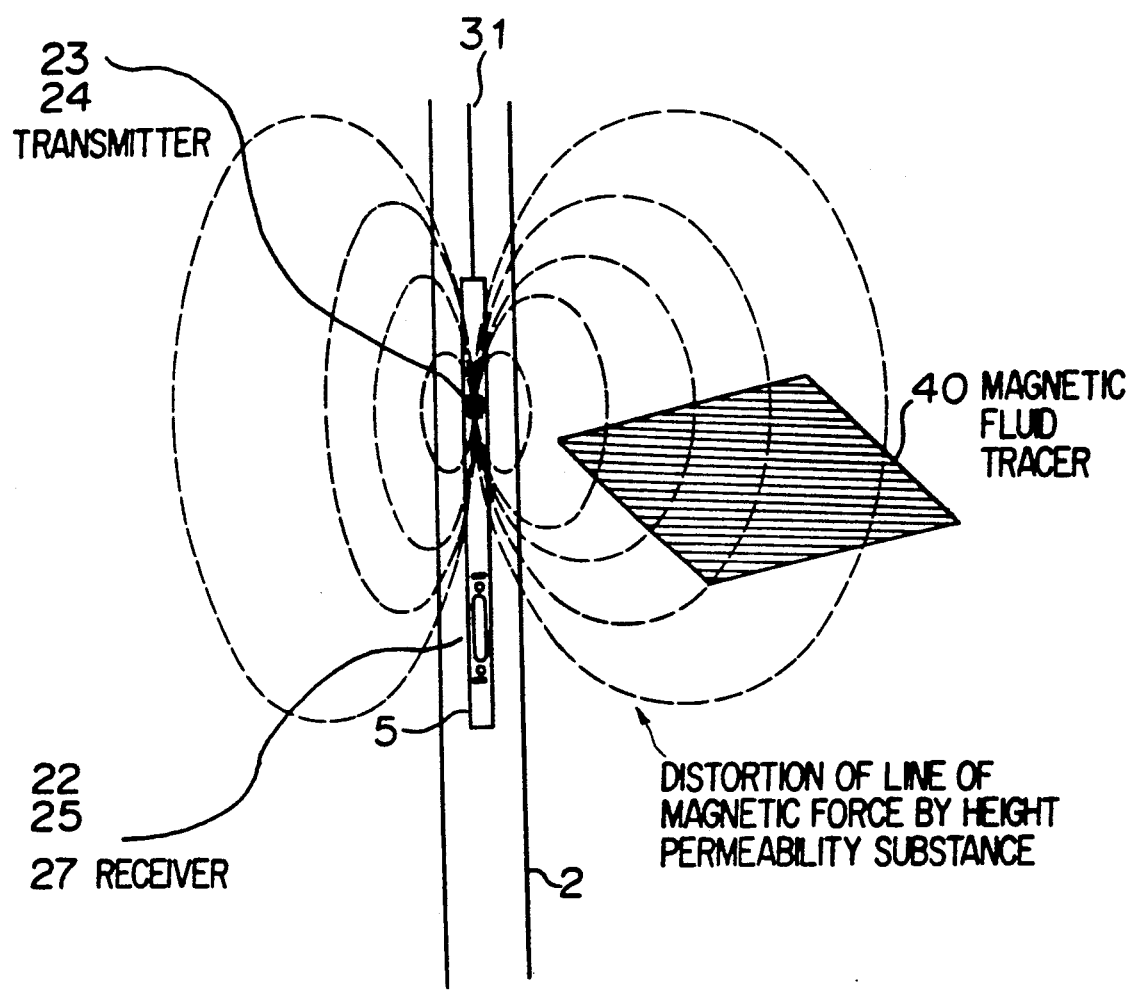
FIGS. 5 and 6 are diagrams showing a method measuring a distortion of line of magnetic force by utilizing the invented system.

FIG. 5 shows a concept in which one of the boreholes 2 (#1), 3 (#2), and 4 (#3), is individually utilized for layer detection. In FIG. 5, a numeral 40 signifies a hypothetical model of a fracture 1 in which the high permeability magnetic particles 13, coated with the surface material 14, are injected, diffused, and floated. The same numerals are used for the same parts or the corresponding parts in FIGS. 1 to 4.

In FIG. 5, the dotted line shows the intensity of the magnetic force line of the earth crust, as a result of the electromagnetic field emitted from the transmitting units 23 and 24 of the inner borehole instruments 5. Assuming that the injected magnetic particle tracers 13 and 14 diffuse, float, and exist at the position of the hypothetical model in FIG. 5 in the shape of the fracture 1, the magnetic force line which passes through the hypothetical model suffers a distortion as shown in FIG. 5 by a high permeability substance of the above magnetic particle tracers 13 and 14. By accurately analyzing the distortion of the magnetic force line, the position, the shape, the inclination, and the flowing rate of the fracture 1 can be determined.

Figure 6:
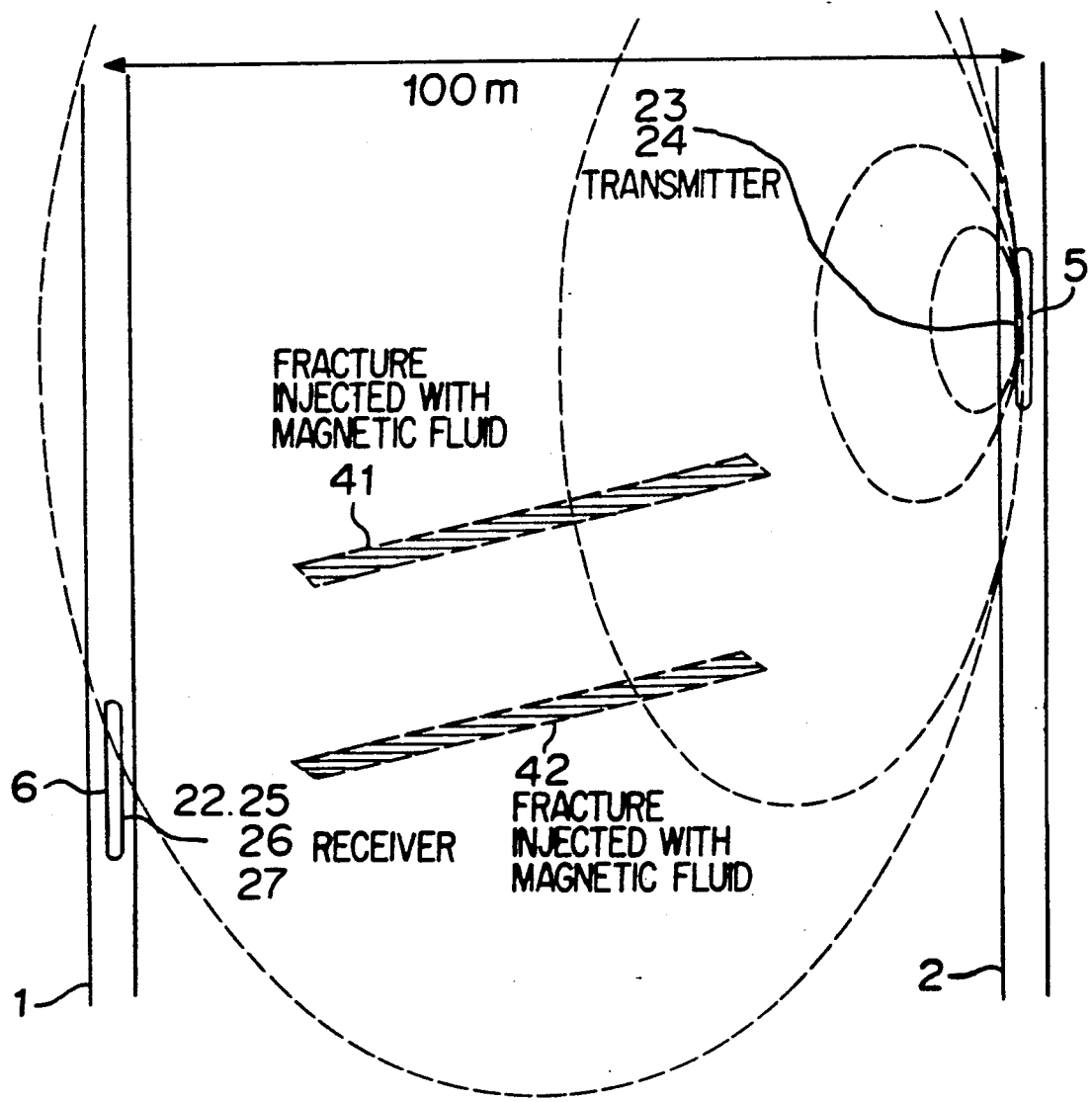

FIG. 6 is a concept diagram of the inner borehole layer direction for inter-borehole tomography, in which the transmitting borehole and the receiving borehole are separated. The boreholes are drilled at the interval of about 100 m. The above high permeability magnetic particle tracers 13 and 14 are injected and the inner borehole instrument (probe) 5 is hung in the borehole 2. The inner borehole instrument (probe) 6 is hung in the borehole 3 (#2) drilled in the neighborhood of the borehole 2 (#1). An electromagnetic field with a predetermined frequency, output format, and time interval is emitted from the transmitting units 23 and 24 of the inner borehole instrument (probe) 5 which is hung in the borehole 2 (#1). A variation of the magnetic force line is measured by the receiving unit 22, and 25 to 27 of the inner borehole instrument 6 (probe). Assuming that the fractures 41 and 42, injected with the magnetic particle tracers 13 and 14, exist in that position, shape, and inclination as shown in FIG. 6, a distortion is created in the magnetic force line which passes through the fractures 41 and 42 as shown in FIG. 6. By measuring the distortion of the magnetic force line, as shown in FIG. 6, the position, the shape, the inclination of the fractures 41 and 42 may be estimated.

An explanation will be given to the outline of the system which detects the shape, the inclination, the capacity, and the moving direction and speed of the geothermal water, containing the above high permeability magnetic particle tracers 13 and 14. This is done by using the individual inner borehole layer detection system shown in FIG. 5 and the inner borehole layer detection system for inter-borehole tomography shown in FIG. 6, in FIG. 7.

Figure 7:
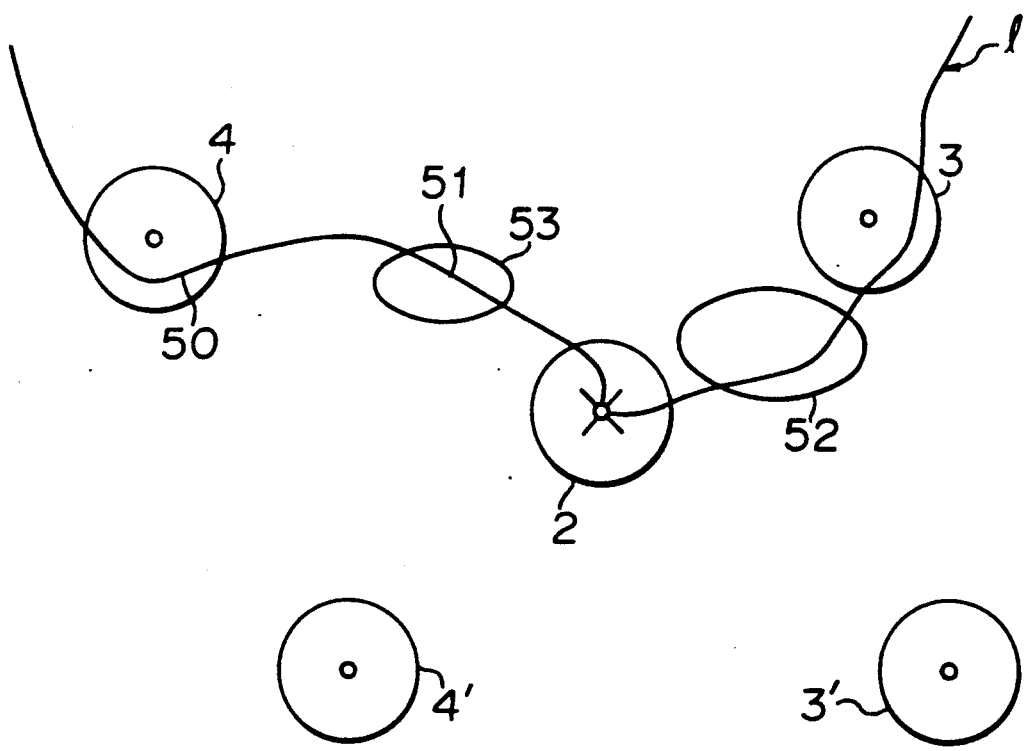
FIG. 7 is an outline plan showing a geothermal zone containing a geothermal water layer.

FIG. 7 is an outline plan of a geothermic zone containing geothermic water layer. In FIG. 7, numerals 2, 3, and 4 are the boreholes 2 (#1), 3 (#2), and 4 (#3) shown in FIG. 1. In the drawing, the other boreholes 3' (#4) and 4' (#5) are drilled at the designated positions. After injecting the above high permeability magnetic particle tracers 13 and 14 from the borehole 2 (#1), the inner borehole instruments (probe) 5, 6, 7, and so on (not shown in FIG. 7) are deployed in the borehole 2 (#1), 3 (#2), 4 (#3), 3' (#4), and 4' (#5). The distortion of the magnetic force line in the borehole is measured, and three-dimensional magnetic force line distortion is measured. Each borehole utilizes an inner borehole instrument (probe) which has a radius of detection limit of about 50 m, and the limit radius is shown by circles centered about the respective boreholes.

After analyzing the result, the passage of the magnetic particle tracer shown by the curve 1 in the drawing can be determined by connecting the passage 50 of the magnetic particle tracers 13 and 14 detected in the borehole 4 (#3) and the passage 51 of the magnetic particle tracers 13 and 14 observed by the measurements at the ground surface. In the drawing, the parts designated by ellipses show the state in which the magnetic particle tracer stays several days after the injection. This information can be used to estimate the existence of the terrestrial fluid body at the position and with the shape of curve 1.

To practically apply this system to detect fractures in the earth crust, an outline of the method for the detection of the fracture will be explained by using a fracture model. In this model a sheet-type fracture of 50 m×20 m in size and 2 mm in thickness is supposed to exist. By assigning the magnetic susceptibility of the field expressed by K ($K=\mu/\mu_0-1)/4\pi$) as 0.3, the specific resistance ($\rho$) as 10 or 100 ($\Omega-m$), the permeability of the injected magnetic particle tracer $\mu$ as 5, the magnetic field from the fracture model shown in FIGS. 8A and 8B in the earth crust can be calculated using the following equation.

$$Ht(r) = H^i(r) - i\omega\sigma_0 \int G^H(r/r') \cdot \eta H^i(r') dA$$

where $G^H$ is the magnetic field Green's function, and the magnetic strength of the fracture is determined by the inductance ($\eta$).

In this equation, H shows magnetic field, $H^t$, total magnetic field, $H^i$, input magnetic field, $\eta$, inductance, $\omega$, frequency (angular frequency (rad/sec)), $\sigma_0$, conductivity, r, measurement point, r', source position, and A, cross sectional area.

Figure 8A:
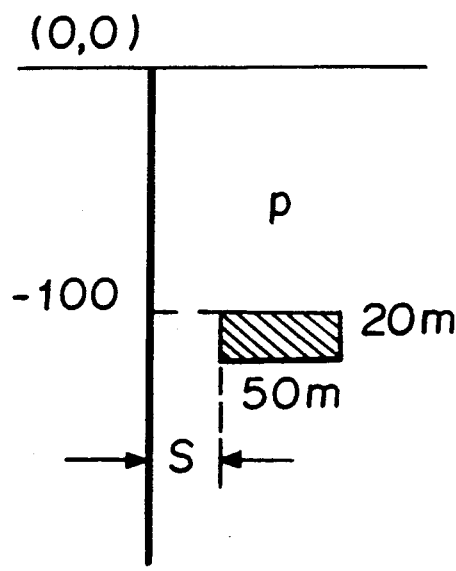
FIGS. 8A and 8B are outline diagrams showing the typical sheet-type fracture models in the earth crust.
Figure 8B:
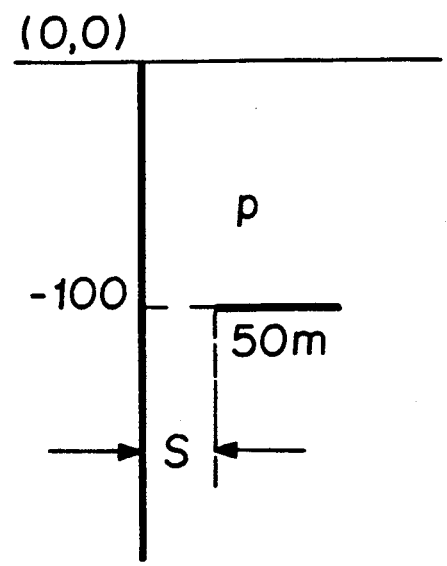
Figure 9A:
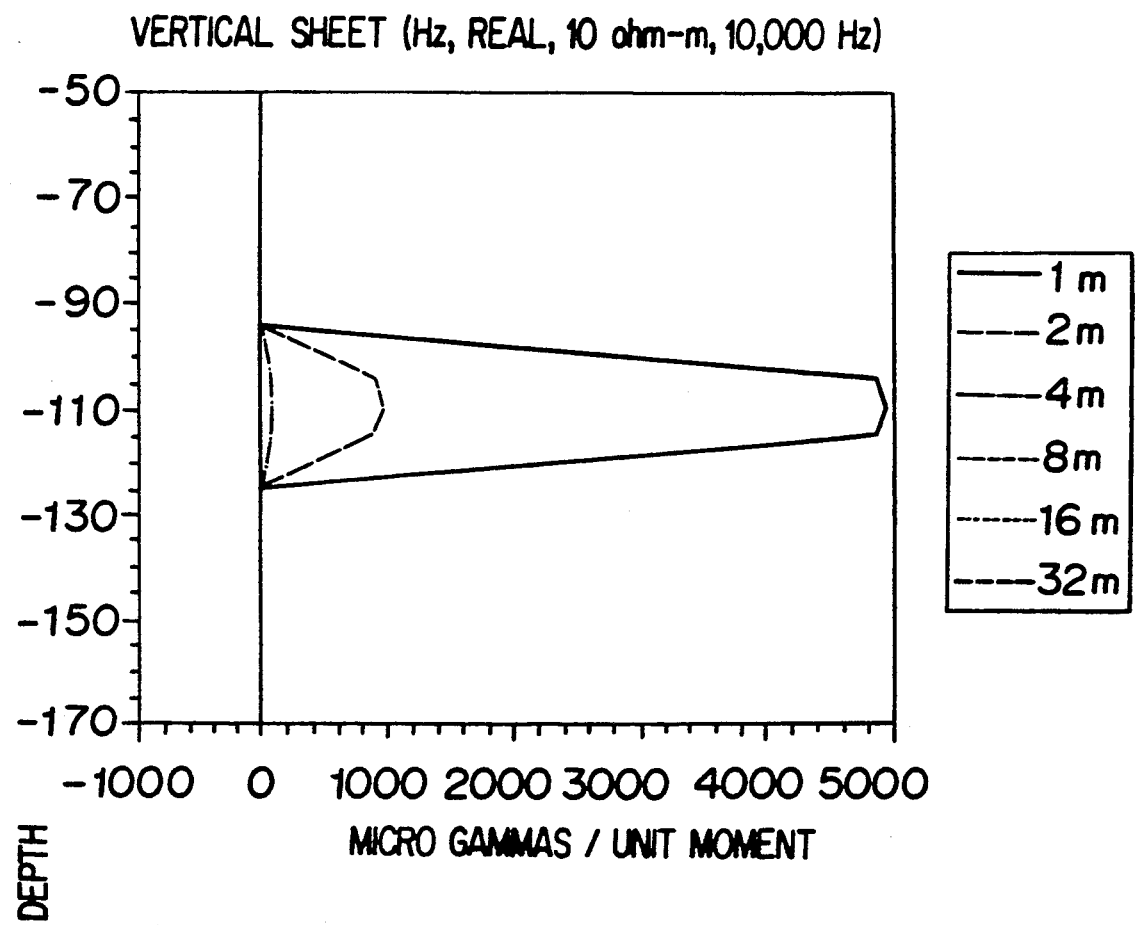
FIG. 9A is a diagram showing the real part of the magnetic field caused by the fracture model shown in FIGS. 8A and 8B.

In this embodiment, the transmitting frequencies used are 0.1, 0.3, 1.0, 3.0, 10.0, and 30.0 (KHz), and measurement is carried out for the magnetic flux density per unit magnetic moment at each point of 1, 2, 4, 8, 16, and 32 m apart from the borehole. The fracture model as shown in FIGS. 8A and 8B generates magnetic fields shown in FIG. 9A in the real part and in FIG. 9B in the imaginary part.

In case when the source strength of the transmitter is 1,000 A·m² with the self noise of the induction coil of the receiver $10^{-3}$ [nT] or below and the resolution power of 1 ppm, the position and inclination of the magnetic particle tracer located several tens of meters away can be obtained. Furthermore, the induction coil noise in nature is reduced dramatically at a depth below the ground surface. Therefore S/N ratio of a magnetic sensor is improved in the ground compared with measurement on the ground.

A data treatment is carried out based on a computer program on the basis of the above equation, and the above terrestrial magnetic distortion is monitored and hard copies are outputted from the printer and so on.

Accordingly, by developing an imaging technique the shape and the inclination of the fracture in the earth crust can easily and visually be expressed with an excellent effect in grasping the state in the earth crust.

Furthermore, when this invention is applied to the fracture in which fluid such as geothermal water is distributed, the flow rate, the capacity, the stagnation degree, and so on can easily and visually be known. In the field of the survey of geothermal water or the survey of oil, this invention produces an excellent effect in utilizing the thermal quantity by knowing the capacity of the geothermal water, the water vein, and other related parameters.

Obviously, numerous modifications and variations of the present invention are possible in light of the above teachings. It is therefore to be understood that within the scope of the appended claims, the invention may be practiced otherwise than as specifically described herein.

What is claimed is:

1. A three-dimensional detection system for detecting fractures and their distributions in the earth crust utilizing an artificial magnetic field which comprises:
   a magnetic particle tracer being injected into the fractures of the earth crust, having high magnetic permeability and specific weight nearly equal to that of a fluid substance existing in the fractures; and
   inner borehole magnetic field detecting devices being hung in a plurality of boreholes which are dug in the earth crust and having transmitters for transmitting said artificial magnetic field and/or receivers for receiving said artificial magnetic field, said transmitters and receivers operating at a predetermined frequency;
   wherein said magnetic field detecting devices detect distortions in terrestrial magnetic force lines caused by said fractures being filled with said injected magnetic particle tracer.

2. The three-dimensional detection system for detecting fractures and their distributions in the earth crust utilizing an artificial magnetic field according to claim 1, wherein the magnetic particle tracer being injected into the fractures of the earth crust is applied with a coating treatment and as a result has a characteristic by which the magnetic particle tracer can be dispersed in water.

3. The three-dimensional detection system for detecting fractures and their distributions in the earth crust utilizing an artificial magnetic field according to claim 1, wherein the inner borehole magnetic field detecting devices being hung in the boreholes which are dug in the earth crust, have three-component magnetic sensors which receive an electromagnetic field having a predetermined frequency.

4. The three-dimensional detection system for detecting fractures and their distributions in the earth crust utilizing an artificial magnetic field according to claim 1, wherein each of the inner borehole magnetic field detecting devices being hung in the boreholes which are dug in the earth crust and having transmitters and/or receivers operating at a predetermined frequency, individually utilizes the same injection borehole with a borehole which is injected with the magnetic particle tracer, receives electromagnetic fields of a predetermined frequency emitted from a transmitter of each of the inner borehole magnetic field detecting devices by a receiver of each of the inner borehole magnetic field detecting devices, and detects a distortion of the terrestrial magnetic fields.

5. The three-dimensional detection system for detecting fractures and their distributions in the earth crust utilizing an artificial magnetic field according to claim 1, wherein the inner borehole magnetic field detecting devices being hung in the boreholes which are dug in the earth crust and having transmitters and/or receivers operating at a predetermined frequency, utilize a borehole which is injected with the magnetic particle tracer and other boreholes from one of which the electromagnetic field is emitted and by the others of which the electromagnetic field penetrated in the earth is received, and detect the distortion of the terrestrial magnetic fields.

6. The three-dimensional detection system for detecting fractures and their distributions in the earth crust utilizing an artificial magnetic field according to claim 1, wherein said high permeability magnetic particle tracer has a high fluidity in water.

7. The three-dimensional detection system for detecting fractures and their distributions in the earth crust utilizing an artificial magnetic field according to claim 6, wherein the high permeability magnetic particle tracer comprises one of Mn-Zn-ferrite, PB-permalloy, PC-permalloy and SENDUST.

8. The three-dimensional detection system for detecting fractures and their distributions in the earth crust utilizing an artificial magnetic field according to claim 2, wherein said high permeability magnetic particle tracer which is applied with a coating treatment has a diameter of about 40 microns.

9. The three-dimensional detection system for detecting fractures and their distributions in the earth crust utilizing an artificial magnetic field according to claim 8, wherein said high permeability magnetic particle tracer is diffused into a geothermal water layer which flows in said fractures.

* * * * *